Patented Jan. 28, 1947

2,414,934

UNITED STATES PATENT OFFICE 2,414,934

MANUFACTURE OF POLYMERIZATION PRODUCTS

Patrick William Denny, Runcorn, England, assignor to Imperial Chemical Industries Limited, a corporation of Great Britain No Drawing. Application October 4, 1943, Serial No. 504,953. In Great Britain October 5, 1942

13 Claims. (Cl. 260—88)

This invention relates to improvements in the manufacture of polymerization products and more particularly to the manufacture of polymerization product from vinyl chloride.

It has previously been proposed to manufacture polymerization products from vinyl chloride by polymerizing vinyl chloride in aqueous emulsion and under pressure in the presence of softening agents, emulsifying agents, and polymerization catalysts such as perborates, persulphates and peroxides. In many cases the product tends to develop colour on heating, and this is disadvantageous for many of the purposes for which the product is required. It has also been proposed to polymerize vinyl chloride in the presence of a peroxide catalyst and formaldehyde, optionally in the presence of a diluent such as alcohol which is a solvent for the monomer, but not for the polymer. The γ polymer insoluble in toluene and other solvents is thereby produced in a finely divided condition. In an example showing the bulk polymerization of vinyl chloride in this way, trioxymethylene was used as the source of formaldehyde in the amount of 0.75 part per 100 parts of vinyl chloride.

It has now been found that by polymerizing the vinyl chloride while in the form of an aqueous emulsion, and in the presence of formaldehyde even in quite small amounts, a polymer is obtained which is completely soluble in the usual solvents, in particular in toluene, and in addition has an improved colour stability at elevated temperatures.

According to the present invention, therefore, toluene-soluble polyvinyl chloride which has an improved colour stability at elevated temperatures is obtained by carrying out the polymerization of the vinyl chloride while dispersed in an aqueous medium, to which dispersion formaldehyde has been added. Advantageously the amount of formaldehyde present is an amount corresponding to between 0.005 and 0.025 part by weight (HCHO) for every part of vinyl chloride.

Formalin is the most convenient form in which to use the formaldehyde, but it may be used in any other form, e. g., as paraformaldehyde, which will be converted to formaldehyde under the conditions existing during the polymerization, and herein and in the subsequent claims, the term formaldehyde is intended to include such other forms. The amount which is needed to effect the improvement in colour is not critical; although amounts between 0.005 and 0.025 part of formaldehyde per part of vinyl chloride are preferred, larger amounts may be used without adversely affecting the colour stability or toluene solubility of the product. Thus for example 0.05 part per part of vinyl chloride or even more may be used, though I do not find that any further advantage accrues by the use of these larger amounts.

The method of carrying out my invention is not modified in essentials by including the formaldehyde in the emulsion. Thus the process may be carried out in an autoclave fitted with a stirrer or turbomixer or other means for agitating the reaction mixture, and with means for supplying vinyl chloride under pressure. A suitable amount of water is then charged into the autoclave in which is dissolved a suitable proportion, e. g. 0.1% to 1.0% by weight of an emulsifying agent, and an amount of the order of 0.1% to 1% by weight of a catalyst for the polymerization such as a per-compound, e. g. an inorganic peroxide such as hydrogen peroxide, or an organic peroxide such as benzoyl peroxide or succinyl peroxide; per-salts such as potassium persulphate or ammonium per-sulphate and the corresponding per-carbonates may also be employed. Emulsifying agents which may be used include the alkali metal and ammonium salts of sulphonated long chain hydrocarbons, or of sulphonated long chain fatty acids such as sulphonated oleic acid, lauric acid, or palmitic acids. Various soaps such as sodium or ammonium palmitates, stearates or oleates may be used. It is also possible to use such materials as agar-agar, gelatine, gum tragacanth, and soluble starch.

A suitable amount of vinyl chloride, e. g., an amount weighing ⅓ of the weight of the water, is then added under a pressure at which the vinyl chloride is liquid, together with, say, 0.01 to 0.05 part of 40% formalin for every part of vinyl chloride. Greater or smaller amounts of vinyl chloride may be used if desired as for example amounts between 25% and 50% by weight of the water. The vinyl chloride is then emulsified by stirring vigorously and polymerized while still dispersed by heating the autoclave at an elevated temperature, e. g. 30° to 80° C., and continuing the stirring. The polymerized product can then be isolated in any suitable manner and dried. Thus the product may be precipitated by means of a coagulant such as methyl or ethyl alcohol, or a metal salt such as sodium or magnesium chloride, lead acetate, alum or aluminium sulphate. Alternatively the product may be left as an emulsion and the emulsion used directly for impregnation or other purposes.

If desired, other constituents may also be included in the reaction mixture, such as plasticisers or softeners for the polyvinyl chloride, which modify the character of the product.

The following example illustrates but does not limit my invention, all parts being parts by weight.

*Example*

100 parts of vinyl chloride were introduced into 212 parts of water containing 2 parts of the sodium salt of a highly sulphonated oleic acid, 0.4 part of ammonium persulphate, 0.25 part of 40% (w./v.) formalin solution, and 8.8 parts of sodium hydroxide in a stainless steel pressure vessel fitted with a stirrer. The vessel was then closed, and the contents heated for 18 hours at 45° C. with continuous stirring. The total pressure generated in the vessel was approximately 5 atmospheres. The latex so formed was coagulated with 100 parts of a 3.5% by weight aqueous lead acetate solution. The resulting solid was washed with water and 2% by weight of borax solution and finally dried in air at 45° C. The product was completely soluble in toluene.

A sheet was made from dried polyvinyl chloride so obtained by mixing 50 parts of dried polymer on rollers heated to between 80° and 100° C. with 20 parts of tricresyl phosphate, 5 parts of dibutyl phthalate, 1.5 parts of titanium oxide and 2 parts of lead silicate. The sheet so obtained was white.

Sheets made in the same way from polyvinyl chloride prepared by a process exactly as above, except that the formalin was omitted, were yellowish in colour.

I claim:

1. A process for the production of toluene-soluble polyvinyl chloride of improved colour stability which comprises dispersing in an aqueous medium containing formaldehyde and a polymerization catalyst, vinyl chloride as the only other unsaturated polymerizable substance, and heating the dispersion under pressure.

2. A process according to claim 1 in which the dispersion also contains an emulsifying agent.

3. A process for the production of toluene-soluble polyvinyl chloride of improved colour stability which comprises dispersing in an aqueous medium containing formaldehyde and a peroxide as polymerization catalyst, vinyl chloride as the only other unsaturated polymerizable substance, and heating the dispersion under pressure.

4. A process according to claim 3 in which the dispersion also contains an emulsifying agent.

5. A process for the production of toluene-soluble polyvinyl chloride of improved colour stability which comprises dispersing in an aqueous medium containing a polymerization catalyst and formaldehyde, vinyl chloride as the only other unsaturated polymerizable substance, said vinyl chloride being added in an amount of 1.0 part per each 0.005 part to 0.025 part of formaldehyde present, and heating the dispersion under pressure.

6. A process according to claim 5 in which the dispersion also contains an emulsifying agent.

7. A process for the production of toluene-soluble polyvinyl chloride of improved colour stability which comprises dispersing in an aqueous medium containing formaldehyde, and a peroxide as the polymerization catalyst, vinyl chloride as the only other unsaturated polymerizable substance, the vinyl chloride being added in an amount of 1.0 part per each 0.005 part to 0.025 part of formaldehyde present, and heating the dispersion under pressure.

8. A process according to claim 7 in which the dispersion also contains an emulsifying agent.

9. A process for the production of toluene-soluble polyvinyl chloride of improved colour stability which comprises dispersing in an aqueous medium containing between 0.1% and 1.0% by weight of an emulsifying agent, 0.1% to 1.0% of a peroxide as polymerization catalyst and formaldehyde, vinyl chloride as the only other unsaturated polymerizable substance, the vinyl chloride being added in an amount of 1.0 part per each 0.005 part to 0.025 part of formaldehyde present, and heating the dispersion under pressure.

10. A process according to claim 9 in which the dispersion of vinyl chloride contains between 0.25 to 0.5 part of vinyl chloride per part of water.

11. A process for the production of toluene-soluble polyvinyl chloride of improved colour stability which comprises dispersing in an aqueous medium containing formaldehyde and a per-salt as polymerization catalyst, vinyl chloride as the only other unsaturated polymerizable substance, and heating the dispersion under pressure.

12. A process for the production of toluene-soluble polyvinyl chloride of improved colour stability which comprises dispersing in an aqueous medium containing formaldehyde and a per-salt as polymerization catalyst, vinyl chloride as the only other unsaturated polymerizable substance, the vinyl chloride being added in an amount of 1.0 part per each 0.005 part to 0.025 part of formaldehyde present, and heating the dispersion under pressure.

13. A process for the production of toluene-soluble polyvinyl chloride of improved colour stability which comprises dispersing in an aqueous medium containing between 0.1% and 1.0% by weight of an emulsifying agent, 0.1% to 1.0% of a per-salt as polymerization catalyst and formaldehyde, vinyl chloride as the only other unsaturated polymerizable substance, the vinyl chloride being added in an amount of 1.0 part per each 0.005 part to 0.025 part of formaldehyde present, and heating the dispersion under pressure.

PATRICK WILLIAM DENNY.